US008087991B2

(12) United States Patent
D'Avanzo

(10) Patent No.: US 8,087,991 B2
(45) Date of Patent: Jan. 3, 2012

(54) GAMING MACHINE AND METHOD OF PLAY

(75) Inventor: Scott D'Avanzo, Ladera Ranch, CA (US)

(73) Assignee: Adrenalin Gaming, LLC, Ladera Ranch, CA (US)

( * ) Notice: Subject to any disclaimer, the term of this patent is extended or adjusted under 35 U.S.C. 154(b) by 825 days.

(21) Appl. No.: 10/792,061

(22) Filed: Mar. 2, 2004

(65) Prior Publication Data

US 2006/0019733 A1 Jan. 26, 2006

(51) Int. Cl.
*A63F 13/00* (2006.01)

(52) U.S. Cl. .......................................... 463/20; 463/16

(58) Field of Classification Search .............. 463/16–25, 463/46, 47; 273/138.1, 139, 142 A–142 D, 273/138.2, 148 R, 148 B
See application file for complete search history.

(56) References Cited

U.S. PATENT DOCUMENTS 5,154,420 A * 10/1992 Gutknecht ...................... 463/17
5,788,573 A * 8/1998 Baerlocher et al. ............. 463/16
5,947,820 A * 9/1999 Morro et al. ...................... 463/9
6,039,649 A * 3/2000 Schulze .......................... 463/16
6,117,009 A * 9/2000 Yoseloff .......................... 463/20
6,347,996 B1 * 2/2002 Gilmore et al. ................. 463/17
6,394,901 B1 * 5/2002 Marta ............................. 463/20
6,537,152 B2 * 3/2003 Seelig et al. .................... 463/30
6,592,457 B1 * 7/2003 Frohm et al. .................... 463/16
6,609,972 B2 * 8/2003 Seelig et al. .................... 463/16
6,685,561 B2 * 2/2004 Anderson et al. ............... 463/16
6,712,694 B1 * 3/2004 Nordman ........................ 463/20
6,722,983 B2 * 4/2004 Kaminkow et al. ............. 463/26
6,814,665 B2 * 11/2004 Seelig et al. .................... 463/25
2004/0051239 A1 * 3/2004 Seelig et al. ............... 273/138.1
2004/0180716 A1 * 9/2004 Seelig et al. .................... 463/20
2005/0181879 A1 * 8/2005 Rothschild ...................... 463/46

* cited by examiner

*Primary Examiner* — David L Lewis
*Assistant Examiner* — Eric M Thomas
(74) *Attorney, Agent, or Firm* — Greenberg Traurig

(57) ABSTRACT

A gaming machine includes a mechanical component for facilitating concealment of a display device during inactivity. Upon activation, a dynamic member of the mechanical component re-positions to reveal the display device showing a player award. The dynamic member and display combination facilitates an unlimited number of gaming machines. By way of example, a bonus game comprises two arms extending from a top portion of a gaming machine. In response to a primary game outcome, a player is provided with an opportunity to select one of the arms. Upon the player's selection, a hand corresponding to the selected arm, turns over and opens to reveal the display device and displayed bonus award. Other examples include flower petals opening and self-opening bottles. The use of mechanical components having one or more dynamic members attract players and facilitate a unique means of generating and displaying a primary or bonus award.

11 Claims, 6 Drawing Sheets

GAMING MACHINE AND METHOD OF PLAY

FIELD OF THE INVENTION

The embodiments of the present invention relate to a gaming machine and method of playing the same. More particularly, the embodiments relate to a gaming machine having a mechanical component, including a dynamic member which incorporates a display for facilitating a gaming award.

BACKGROUND

The popularity of gaming has exploded over the last ten years. The result has been the consistent opening of new casinos throughout the United States and worldwide. In fact, casinos are opening at a record pace to keep up with the seemingly endless demand. The steady demand has also facilitated the creation of new wagering games.

One sector of gaming that has seen incredible growth is related to electronic gaming machines. Indeed, slot machines and video poker machines now generate more revenue than live table games. Based on the popularity of electronic gaming machines, casinos have apportioned a higher percentage of their floor space for the installation of electronic gaming machines.

Therefore, new electronic gaming machines are being developed at an exhaustive pace. Unfortunately, to date, a vast majority of the new gaming machines are not extremely popular. For example, new slot machines are being based on movie, television, entertainers and related themes (e.g., Garfield®, Elvis®, etc.). However, the underlying gaming machine operation remains generally the same. Players desire new creative gaming concepts rather than the same old machines incorporating a new theme.

Thus, there continues to be a need for new wagering electronic gaming machines exhibiting new gaming characteristics which allow player interaction and create gaming excitement.

SUMMARY

Accordingly, the embodiments of the present invention provide an electronic wagering game incorporating a mechanical component having a dynamic mechanical member for facilitating the concealment of a display. At the appropriate time, the dynamic member activates and reveals the display. The display shows a player award. The number of different applications of the mechanical component are limitless.

In a first embodiment, the mechanical component comprises a pair of arms and hands extending from an upper portion of a gaming machine. A display is then concealed by each hand. In response to one or more pre-established gaming machine outcomes, a player is afforded the opportunity to select one of the hands. Upon the hand selection, the hand turns, opens and reveals the display and displayed award, if any. Then, the non-selected hand turns, opens and reveals the non-selected award or a zero award. In this manner, the player interacts with the game by selecting the hand and corresponding award. Of course, more than two arms and hands may be incorporated on a single gaming machine. Optionally, each arm may support a watch having a display. The watch display may be used to display an additional award, a multiplier or other award manipulator.

In a second embodiment, the mechanical component comprises a plurality of flowers extending from the gaming machine. Petals of each flower conceal a display. Again, in response to a pre-established gaming machine outcome, the player selects one of the flowers. Upon the flower selection, the flower petals opens (i.e., blooms) to reveal a display displaying an award. Then, the remaining flowers open to reveal the unselected awards. Optionally, flower leaves may incorporate displays for displaying awards and multipliers.

In a third embodiment, the mechanical component comprises a plurality of bottles having corresponding caps. Each cap conceals a display on an underside thereof. Again, in response to a pre-established gaming machine outcome, the player selects one or more of the bottles. Upon the bottle selection, the corresponding cap opens to reveal the display displaying an award. Then, the remaining caps open to reveal the unselected awards.

In a fourth embodiment, the mechanical component comprises a jack-in-the-box. The jack-in-the-box contains a display. In this embodiment, there is no player selection but instead the player cranks a jack-in-box arm or presses a button to cause the jack-in-the-box to jump out of the box. Either way, the jack-in-the-box jumps from the box to reveal the display displaying an award.

The use of the displays in combination with a mechanical or video gaming machine component provides a versatile means for awarding prizes. Other embodiments, modifications and variations are evident from the corresponding drawings, detailed description and claims as set forth herein.

DETAILED DESCRIPTION

In general terms, the operation of electronic gaming machines are controlled by microprocessors that communicate with internal memory devices and external features, including player interfaces, of the gaming machine. The microprocessor also incorporates, or communicates with, a random number generator which ensures the randomness of the gaming machine outcomes. In the embodiments of the present invention, the microprocessors also control dynamic members of the gaming machines.

Figure 1:
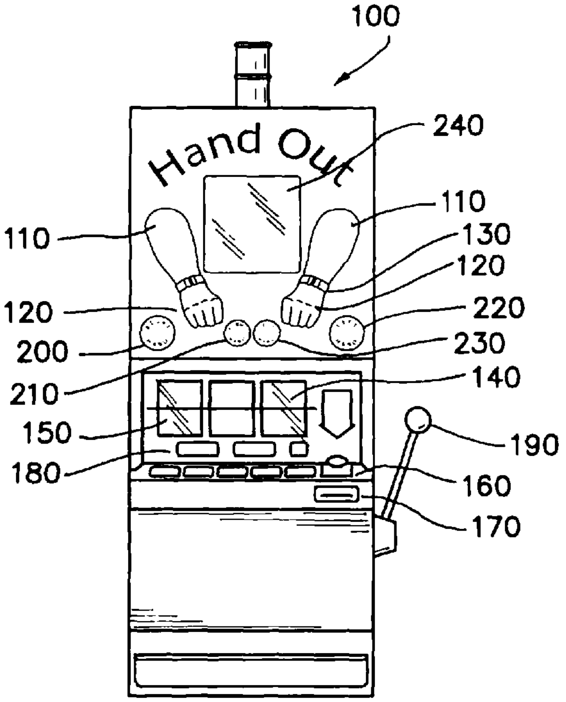
FIG. 1 illustrates a front view first embodiment of the present invention having two arms and hands extending therefrom.

Reference is now made to the figures wherein like parts are referred to by like numerals throughout. FIG. 1 illustrates a gaming machine, more particularly a slot machine 100, having two arms 110 and two corresponding hands 120 extending from a top section thereof. Each arm 110 further carries a watch 130. While a slot machine 100 is shown, any type of electronic gaming machine, including a video poker, keno or bingo machine may facilitate the embodiments of the present invention. The slot machine 100 incorporates one or more conventional reels 140, payline 150, coin slot 160, bill and coupon validator 170, credit display 180 and arm 190.

Figure 2:
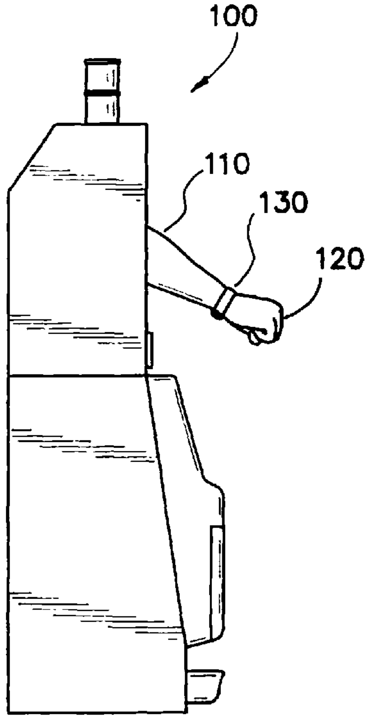
FIG. 2 illustrates a side view of the first embodiment of the present invention.

To facilitate the play of the slot machine 100 a right hand selector button 200, right watch selector button 210, left hand selector button 220 and left watch selector button 230 are integrated on the top section of the slot machine 100 or player control panel. FIG. 2 illustrates one arm 110 and hand 120 extending from the top section of the slot machine 100.

Figure 3A:
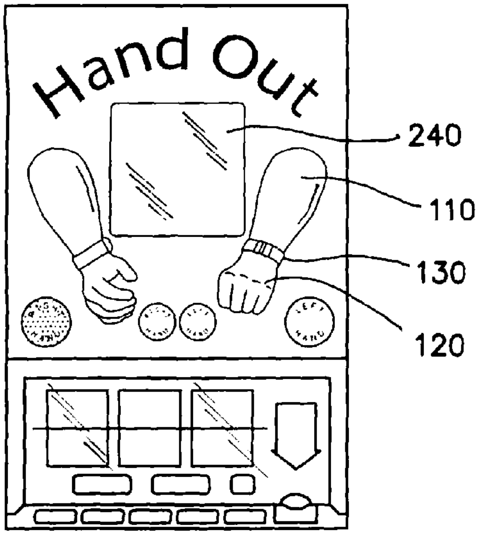
FIG. 3*a* illustrates a front view of the first embodiment of the present invention once a right hand has been selected.
Figure 3B:
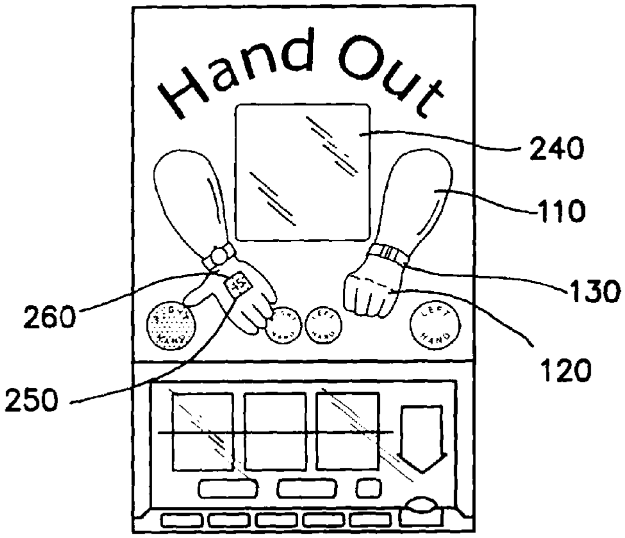
FIG. 3*b* illustrates a front view of the first embodiment of the present invention once a hand has completely opened to reveal a hand display and displayed award.
Figure 3C:
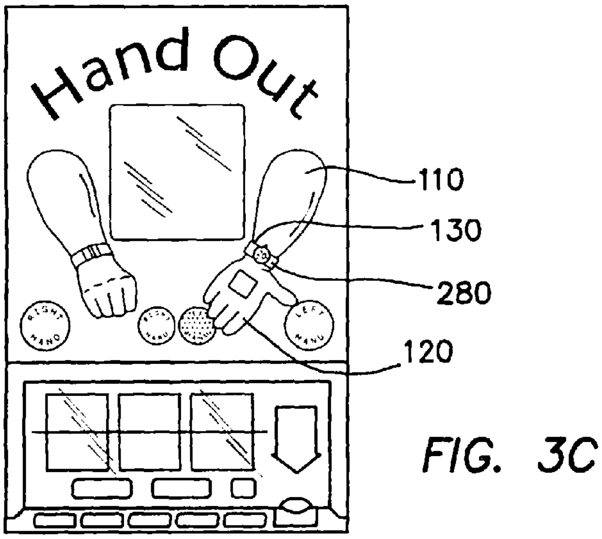
FIG. 3*c* illustrates a front view of the first embodiment of the present invention once a hand has completely opened to reveal a watch display and displayed award.

In the embodiment shown, the hands 120 and arms 130 facilitate a secondary or bonus game. However, the hands 120 and arms 130 may also facilitate a primary game. As shown in FIGS. 3*a*-3*c*, in the bonus game arrangement, upon a pre-established primary game outcome (e.g., one or more palm or hand gaming indicia on the payline 150), the bonus game activates. To alert the player of the bonus game activation, audio outputs and/or visual outputs via video screen 240 may be utilized. The video screen 240 and audio outputs may also be used to enhance the operation of the bonus game. For example, the audio output may prompt the player to select the right hand or left hand using the right hand selector button 200 or left hand selector button 220. Upon selection of one of the hands 120, that hand 120 turns over and opens to reveal a display 250 which displays a bonus award 260. The display 250 may be a digital screen, LED display, LCD display or similar device. The physical operation of the hands 120 is controlled by a machine processor (not shown) in communication with a small motor or servo device (not shown). In other words, the processor signals the proper motor to activate in response to the player's hand selection. In addition, the display 250 communicates with the machine processor. In particular, the display 250 displays awards generated by the processor and random number generator. Once the player has been awarded the bonus award, the other hand 120 may open to show the non-selected award, if any.

From an internal standpoint, upon the occurrence of the pre-established primary game outcome, the machine's random number generator generates two bonus outcomes. The processor then sends each of the outcomes to a different display 250, one in each hand 120. The player is then provided with the opportunity to select one of the hands 120. Each bonus award then has a 50% chance of being selected. With additional hands, the percentage that each bonus award will be selected decreases accordingly.

Optionally, each hand 120 may support a watch 130, having a display 280. In a manner similar to the open hands 120 concept, the watches 130 may display awards in response to alternative primary game outcomes (e.g., one or more watch gaming indicia on the payline 150). The watch display 280 and hand display 250 may be used individually, or in combination wherein the watch display 280 displays a multiplier used to enhance the award on the hand display 250.

Figure 4:
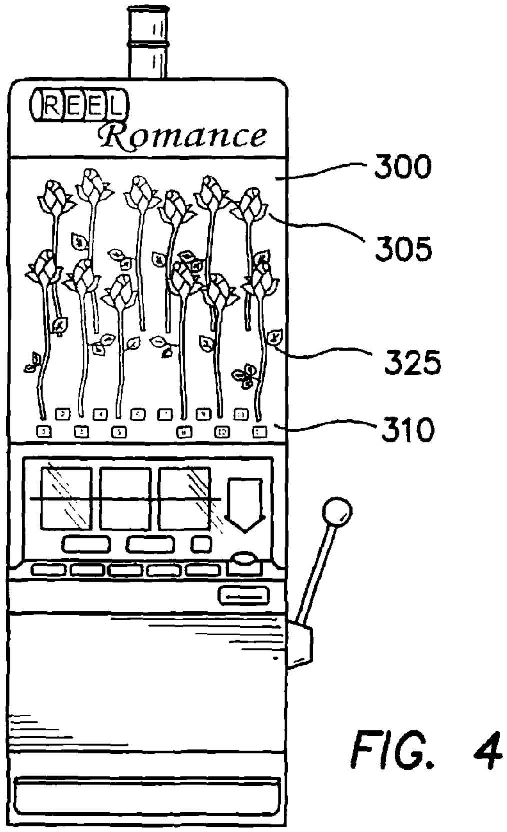
FIG. 4 illustrates a front view of a second embodiment of the present invention having a plurality of flowers.
Figure 5:
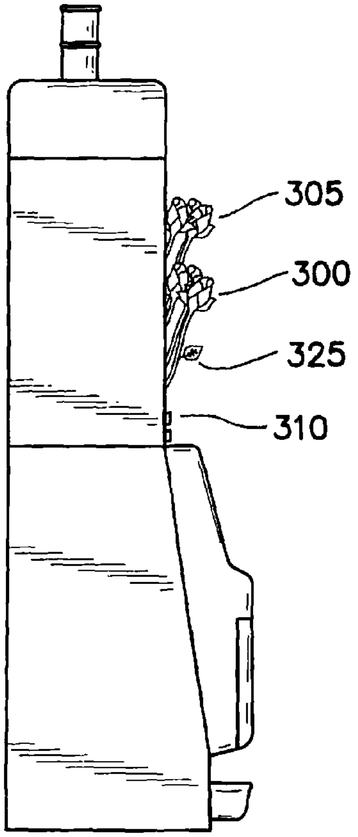
FIG. 5 illustrates a side view of the second embodiment of the present invention.
Figure 6:
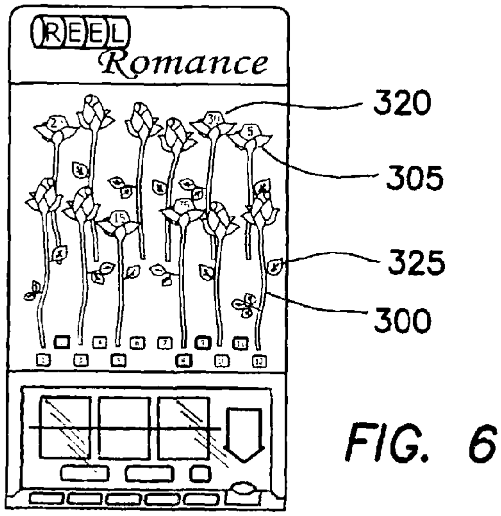
FIG. 6 illustrates a front view of the second embodiment of the present invention after several flowers have been selected by a player.
Figure 7:
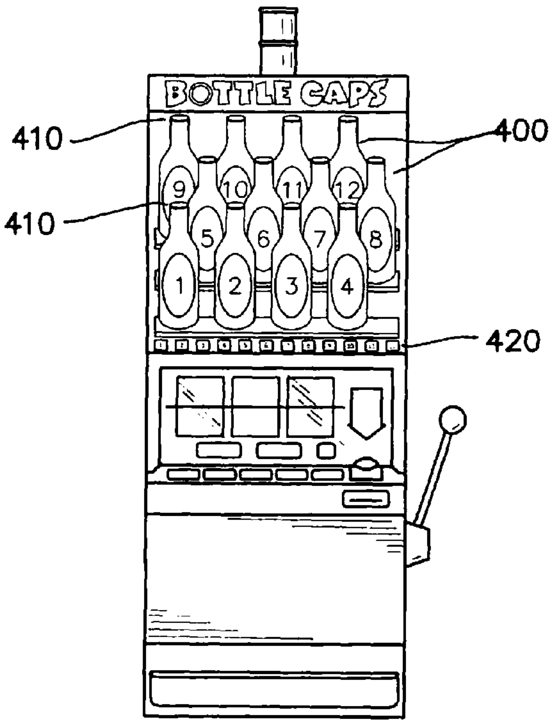
FIG. 7 illustrates a front view of a third embodiment of the present invention having a plurality of bottles.
Figure 8:
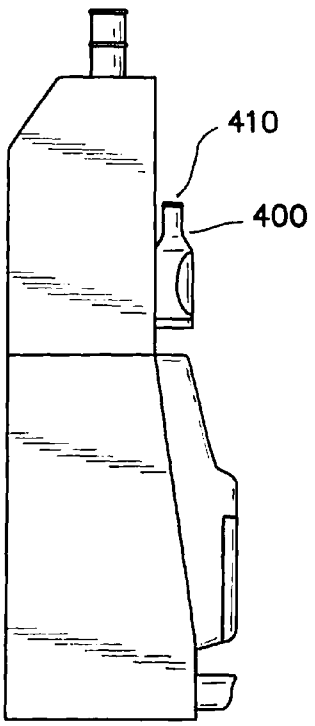
FIG. 8 illustrates a side view of the third embodiment of the present invention.

FIGS. 4-6 illustrate a flower embodiment of the present invention comprising a plurality of flowers 300. Each flower 300 includes a corresponding selection button 310. In response to one or more pre-established primary game outcomes, the player is afforded the opportunity to select one or more of the flowers 300 shown in FIG. 6, upon selection of the flower 300, the flower petals 305 open or bloom to reveal a display 320 showing an award. The petals 305 of multiple flowers 300 may also open to reveal multiple displays 320 displaying awards and/or multipliers or combinations thereof. Like the hands embodiment disclosed above, the opening of the flower petals 305 is controlled by a small motor or servo device. Once the player has been awarded the displayed award, the other flowers 300 may open to show the non-selected awards, if any. Optionally, flower leaves 325 may incorporate display devices (not shown) for displaying awards and/or multipliers.

Figure 9:
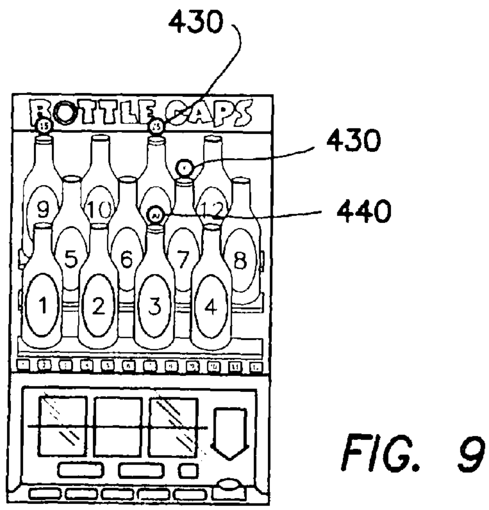
FIG. 9 illustrates a front view of the third embodiment of the present invention after one bottle has been selected.
Figure 9A:
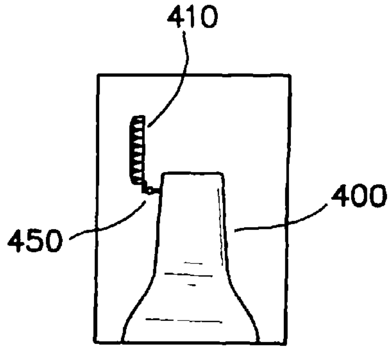
FIG. 9*a* illustrates a side view of a bottle and cap arrangement of the third embodiment of the present invention.

A bottle embodiment of the present invention is shown in FIGS. 7-9*a*. A plurality of bottles 400, corresponding cap 410 and selector buttons 420 facilitate play of the bonus game. In response to a pre-established primary game outcome, the player is afforded the opportunity to select one or more of the bottles 400 by using the selector buttons 420. As shown in FIG. 9, upon said selection, the caps 410 of the selected bottles 400 open to reveal a display 430 and award 440. A motor or servo controls the opening of the caps 410. As shown in FIG. 9*a*, in one embodiment, the caps 410 are attached to the bottles 400 by means of a spring-loaded hinge 450. Other attachment means are also possible. Once the player has been awarded the displayed award, the other caps 410 may open to show the non-selected awards, if any.

Figure 10:
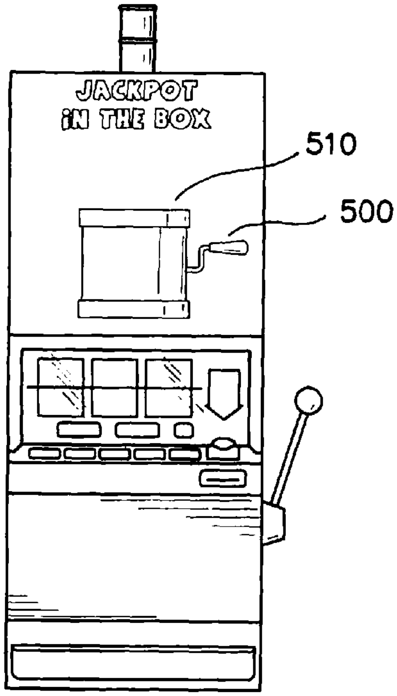
FIG. 10 illustrates a front view of a fourth embodiment of the present invention having a jack-in-the-box.
Figure 11:
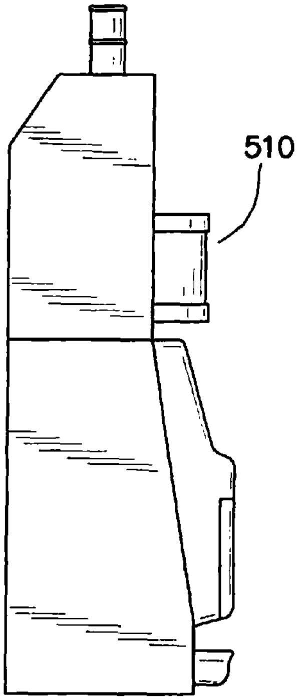
FIG. 11 illustrates a side view of the fourth embodiment of the present invention.
Figure 12:
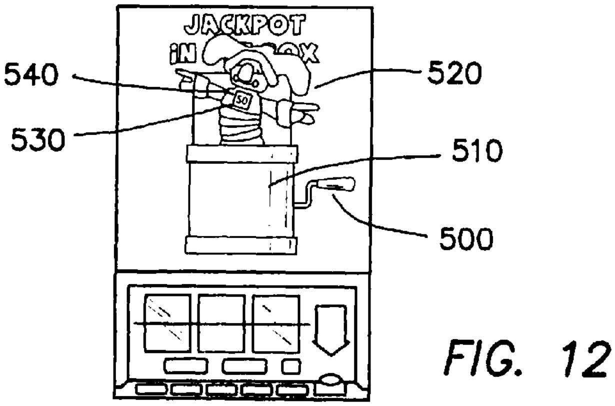
FIG. 12 illustrates a front view of the fourth embodiment of the present invention after the jack-in-the-box has jumped from the box.

FIGS. 10-12 illustrate a fourth jack-in-the-box embodiment of the present invention. With the fourth embodiment, upon a pre-established primary game outcome, the player may either cause a crank arm 500 of a jack-in-the-box 510 to automatically turn or may manually turn the crank arm 500. At a random moment, the jack-in-the-box 510 opens and a clown or jack 520 pops out of the box. The clown or jack 520 also contains a display 530 for displaying an award 540.

Figure 13:
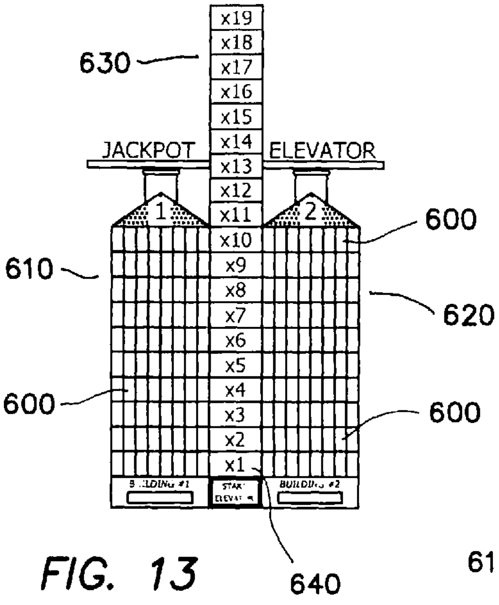
FIG. 13 illustrates a front view of a fifth embodiment of the present invention having an elevator between two buildings.
Figure 14:
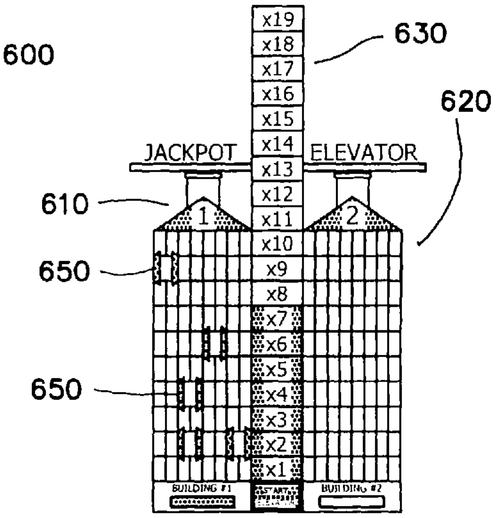
FIG. 14 illustrates a side view of the fifth embodiment of the present invention.
Figure 15:
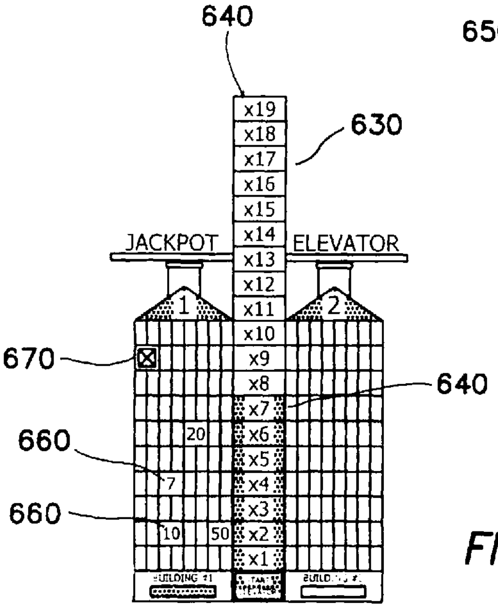
FIG. 15 illustrates a front view of the fifth embodiment of the present invention after one or more windows have been selected and the elevator has risen.

FIGS. 13-15 illustrate a fifth building and elevator embodiment of the present invention. With the fifth embodiment, upon a pre-established primary game outcome, the player or the machine selects, depending on the primary game outcome, one or more windows 600 from a first building 610 and/or second building 620. Once the selections are completed, an elevator 630 advances to a randomly generated floor. Then, a display illuminates to reveal the floor number 640 which acts as a multiplier. Alternatively, a set of retractable elevator doors open to reveal a displayed multiplier. To enhance the player experience, as the elevator 630 advances an integrated speaker system or similar arrangement produce sounds (e.g., bells) as the elevator passes each floor. Next, window coverings 650 corresponding to the selected windows 600 or doors open to reveal a displayed award 660. In one embodiment, awards below the floor number 640 are multiplied by the multiplier to determine the total award. Non-awards 670 are identified. Alternatively, awards above the floor number 640 are multiplied by the multiplier to determine the total award. Optionally, a player may be provided a means for selecting above or below prior to the activation of the elevator 640.

The embodiments of the present invention provide a unique method for generating and displaying any award, multiplier or combination thereof in conjunction with a mechanical gaming machine component. The dynamic mechanical component functions to attract players while the integrated displays provide versatility for generating and displaying awards.

It is to be understood that even though numerous characteristics of the present invention have been set forth in the foregoing description, together with an explanation of various possible embodiments and modifications thereto, this disclosure is illustrative only and changes may be made within the spirit of the invention to the full extent indicated by the broad general meaning of the terms in which the appended claims are expressed.

I claim:

1. A gaming machine comprising:

a mechanical component, said mechanical component having a dynamic member operable to conceal a display device, said display device integrated with said mechanical component; and wherein upon activation of the mechanical component said dynamic member moves to reveal the display device, which prior to activation of said mechanical component depicts a gaming machine symbol related to a gaming machine award or a gaming machine award amount, such that when revealed, said display device is depicting the a randomly generated gaming machine symbol related to a gaming machine award, or a gaming machine award amount.

2. The machine of claim 1 wherein said mechanical component comprises one or more arms extending from said gaming machine.

3. The machine of claim 2 wherein said dynamic member comprises one or more hands joined to said arms.

4. The machine of claim 3 wherein a player is afforded the opportunity to select one or more of the hands to reveal the symbol related to a gaming machine award.

5. The machine of claim 4 wherein upon selection of one or more of the arms, the corresponding hand opens to reveal the display device.

6. The machine of claim 2 wherein the one or more arms support a watch having a display.

7. A method of playing a gaming machine comprising:

activating a mechanical component, having a dynamic member, in response to a pre-established gaming machine outcome; and in response to said activation, causing said dynamic member to move to reveal a display device, which prior to activation of said mechanical component depicts a gaming machine symbol related to a gaming machine award or a gaming machine award amount, such that when revealed substantially concealed therein, wherein said display device is depicting the a randomly generated gaming machine symbol related to a gaming machine award, or a gaming machine award amount said display device integrated with said mechanical component.

8. The method of claim 7 wherein said mechanical component comprises one or more arms extending from said gaming machine.

9. The method of claim 8 wherein said dynamic member comprises one or more hands each joined to the arms.

10. The method of claim 9 wherein a player is afforded the opportunity to select one or more of the hands to reveal the symbol related to a gaming machine award.

11. The method of claim 10 wherein upon selection of one or more of the hands, the corresponding hand opens to reveal the display device.

* * * * *